United States Patent [19]
Kharas et al.

[11] Patent Number: 5,136,017
[45] Date of Patent: Aug. 4, 1992

[54] CONTINUOUS LACTIDE POLYMERIZATION

[75] Inventors: Gregory B. Kharas, Chelmsford; Israel D. Fridman, Belmont; Speros P. Nemphos, Clinton, all of Mass.

[73] Assignee: Polysar Financial Services S.A., Fribourg, Switzerland

[21] Appl. No.: 659,567

[22] Filed: Feb. 22, 1991

[51] Int. Cl.⁵ .................. C08G 63/08; C08F 2/00
[52] U.S. Cl. ........................... 528/354; 526/65; 526/67; 526/68
[58] Field of Search ............... 528/354; 623/16; 526/65, 67, 68

[56] References Cited

U.S. PATENT DOCUMENTS 3,879,352  4/1975  Ames et al. ............... 526/65
4,643,734  2/1987  Lin ............................ 528/354

Primary Examiner—John Kight, III
Assistant Examiner—Shelley A. Wright
Attorney, Agent, or Firm—Stevens, Davis, Miller & Mosher

[57] ABSTRACT

Lactide monomers and copolymers may be polymerized by a continuous process using one or more continuous stirred tank reactors. The process offers productivity and product quality advantages over the batch process of polymerization.

13 Claims, 1 Drawing Sheet

CONTINUOUS LACTIDE POLYMERIZATION

FIELD OF THE INVENTION

The present invention relates to the manufacture of polymers of l, d, dl or meso lactides. More particularly the present invention relates to a process for the continuous production of such polymers.

BACKGROUND OF THE INVENTION

Canadian patent 808,731 issued Mar. 18, 1969 to Ethicon Inc. discloses a process for the formation of polylactides using a catalyst of the formula $R_1MR_2$ wherein $R_1$ and $R_2$ are hydrocarbyl groups having from 1 to 12 atoms and M is a divalent metal of group II of the periodic table. The patent teaches that the polymerization may be carried out as a bulk polymerization. However, the patent does not disclose a continuous process. Rather the process is a batch process.

WO 90/01521 (PCT/US89/03380) application in the name of Batelle Memorial Institute discloses a degradable thermoplastic made from lactides. The disclosure teaches at page 19, that the polymerization process may be conducted in a batch, semi-continuous or continuous manner. However, no further details of a continuous process are disclosed and all the examples use a batch process. The disclosure does not suggest a process using a chain of one preferably two or more reactors in series. The Batelle patent application gives an extensive discussion of the prior art and no prior art seems to contemplate a continuous reaction using a chain at least one, preferably two or more reactors in series.

The present seeks to provide a novel process for the continuous polymerization of polylactides in which one, preferably a chain of at least two reactors in series is

SUMMARY OF THE INVENTION

The present invention provides a continuous process for the polymerization of monomeric mixture comprising from 100 to 60 weight % of one or more monomers the formula

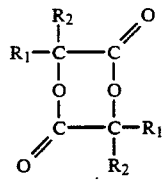

wherein $R_1$ is a hydrogen atom or a $C_{1-4}$ alkyl radical; and $R_2$ is a hydrogen atom or a $C_{1-8}$ alkyl radical, provided that $R_1$ and $R_2$ cannot both be a hydrogen atom; and 0-40 weight % of one or more copolymerizable monomers which comprises:
  (a) forming a melt or solution of said monomers;
  (b) passing said monomeric melt or solution through at least one reactors operated at temperatures from 150° to 250° C. and at a pressure ranging from 0.5 to 5 atmospheres at a rate and for a period of time to provide not less than 75% conversion of said monomer mixture to polymer.

FIG. 1 is a schematic drawing of a reactor system which may be used in accordance with the present invention.

DETAILED DESCRIPTION

Figure 1:
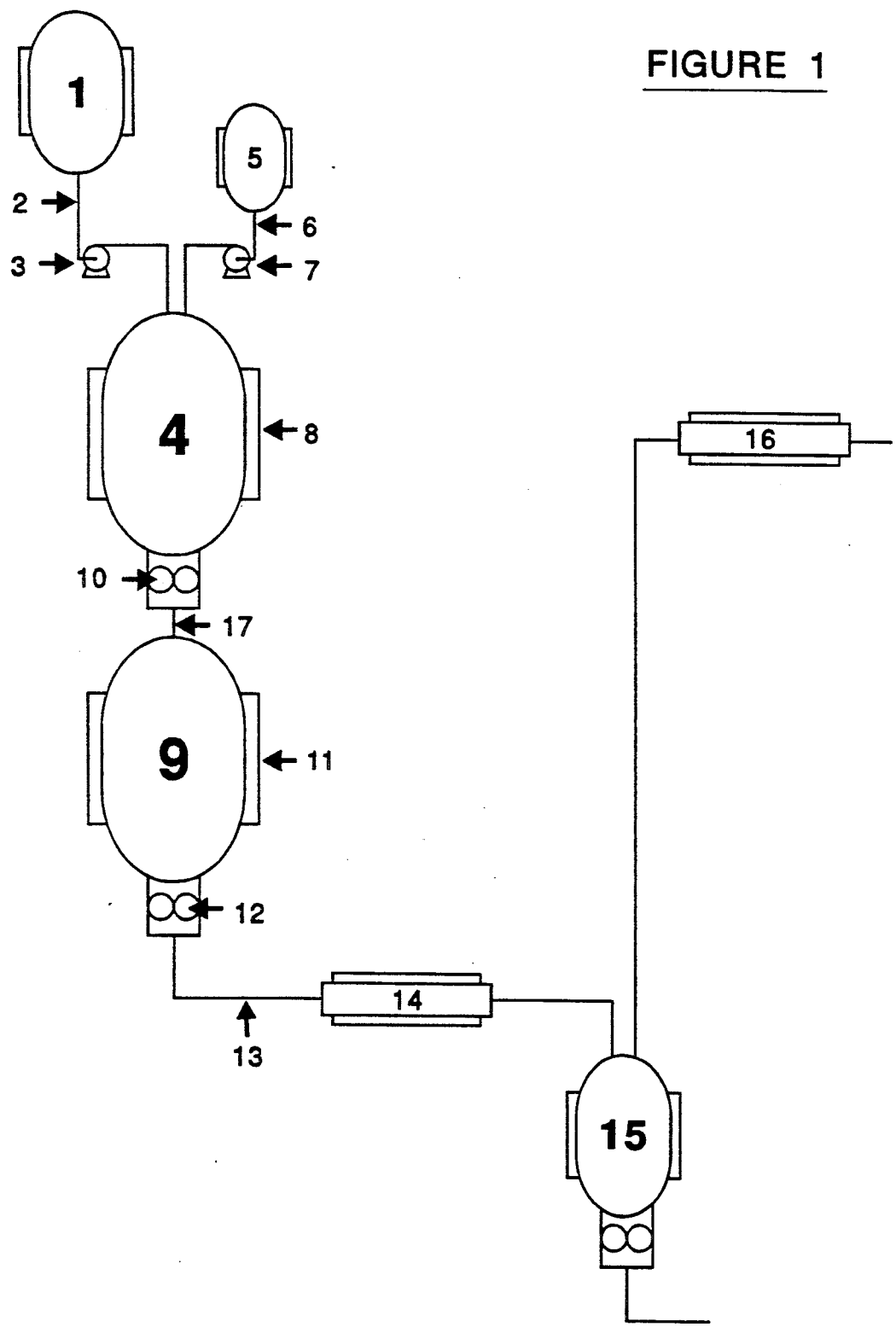

The monomers of formula I useful in accordance with the present invention may be obtained from a number of sources. Preferably the monomer is obtained from the fermentation of a relatively inexpensive feed stock such as starch derived from sugar(s) etc. However, it should be borne in mind that generally such procedures result in a racemic mixture of the d, and l, monomer and the polymerization of such a mixture will result in a polymer having a relatively low level of crystallinity. Preferably the monomers will be selected to provide higher crystallinity polymers comprising a relatively grater amount, preferably at least 75 more preferably at least 85 weight % of the l, monomer and up to about 25 preferably less than 15 weight % of the d monomer. Such a blend of monomers should also provide relatively higher melting polymers, having a melting temperature in the range from 130° to 170° C. However, other mixtures of the monomers may be used if melting temperature is not a significant concern as would be the case for example in blister packaging.

A particularly useful monomer of formula 1 may be a lactide, that is a alpha hydroxy lactic acid. Suitable monomers of formula 1 also include may be a $C_{1-8}$ alkyl ester of lactide. Suitable copolymerizable monomers include cyclic $C_{2-4}$ alkylene oxides such as polypropylene oxide. Other functional monomers may be included in the monomeric mixture provided they will not significantly hydrolyse the resulting polymer. Preferably, the copolymerizable monomers will be esters.

The monomeric mixture may comprise 100 weight % of one or more monomers of formula 1. Preferably, the mixture will comprise from 100 to 65 more preferably 100 to 85 weight % of one or more monomers of formula 1, and from 0 to 35 preferably not more than about 15 weight % of one or more copolymerizable monomers.

The present invention will now be described in association with FIG. 1 in which like parts have like numbers.

The monomers are fed into a prereactor 1 which is a heated vessel. The vessel may be heated by oil or steam or pressurized water maintained at initial temperature T1. The vessel is heated to above the melting point of the monomer mixture to be polymerized. Typically the temperature will be from about 125° to 150° C. The monomers may be fed to the prereactor in dry form or may be in the form of a solution or suspension. If the monomers are in the form of a solution the concentration of monomers in solvent or diluent should be as high as practicable, and preferably not less than about 85% by weight. There are a number of suitable diluents or solvents including $C_{6-12}$ aromatic solvents, $C_{6-12}$ alkanes which are unsubstituted or substituted by a $C_{1-4}$ alkyl radical, and $C_{1-6}$ alkyl ketones. Suitable aromatic diluents include ethyl benzene and toluene. Suitable $C_{6-12}$ alkanes include hexane and ethyl hexane. Suitable $C_{1-6}$ ketones include acetone. The prereactor is joined to the first reactor by a heated line 2 maintained at constant temperature. The monomer melt is pumped to the first reactor 4 by pump 3. The pump is also heated to maintain a constant temperature of at least T1. The heating means on the pump 3 and line 2, may be any suitable means such as an electric heating line steam line or hot oil and preferably controlled independently.

In an alternate embodiment the lactide monomer may also be delivered directly to the first reactor using a dry bulk feed apparatus. Such as approach is of greater simplicity as it replaces the pre-reactor, metering pumps, associated lines, heating equipment and controls, with a simple self-contained unheated device. In addition such a feed device provides a simple process to stop the process without compromising monomer feed which otherwise would be in a melt. However, it should be noted that such a feed device should be equipped with water cooling capability to avoid premature melting of incoming monomer. Premature melting could lead to monomer feed blockage.

Reactor 1 and also the subsequent reactors may typically be a stirred vessel, such as a continuous stirred tank reactor, capable of operating at reduced and elevated pressure and temperatures up to about 250° C. The reactor configuration may be spherical, cylindrical or tubular. The agitator may be of any suitable type for the reactor including turbine, anchor, paddles and screw conveyor, or combinations thereof, such as an axial flow turbine in combination with peripheral anchor(s) or anchors in combination with peripheral a single or double helix ribbon.

In a preferred, optional, embodiment a catalyst is used to increase the rate of reaction. A wide range of catalysts are suitable to promote the rate of the reaction. The catalyst may be an acid cation exchange resin, acid clay, activated clay, bentonite, alumina, or an aluminum complex of the formula $Al(O-R)_3$ where R is a$C_{2-6}$ alkyl radical, talc, silicic acid, metal complexes of the formula $R_1MR_2$ wherein $R_1$ and $R_2$ independently may be selected from the group consisting of $C_{1-18}$, preferably a $C_{5-10}$ carboxy radicals, an oxygen atom, a halogen atom, and M is a group II or IV metal atom. Preferably M is selected from the group consisting of magnesium, calcium, tin and lead. Preferably, $R_1$ and $R_2$ are the same and are $C_{5-10}$ carboxyl radicals. Particularly useful catalysts include stannous octoate and the aluminum complex $Al(O-R)_3$. Such aluminum complexes are disclosed in H R. Dricheldorf Macromolecules Vol. 21, No. 2 p. 286 (1988).

The catalyst may be added to the first and/or any subsequent reactor. In the drawing a catalyst vessel is shown at 5. The catalyst may be used as a dilute solution or suspension. However, preferably the catalyst is used in undilute form. The catalyst vessel is connected to the first reactor by a line 6 and a pump 7. As noted-above, the catalyst vessel need not be only connected to the first reactor. It may be connected to one or more subsequent reactors.

The monomers and optionally catalyst are fed to the first reactor 4. The first reactor 4 has a jacket 8 which may be heated by steam or hot oil or pressurized hot water to a temperature T3. The reactor is operated at temperatures from about 150 to 225, preferably from 175 to 200, most preferably about 175° C. and at a pressure from about 0.5 to 5.0, preferably about 1.0 atmospheres pressure. Typically, the reactor is a stirred tank reactor. That is there is agitation in the reactor using typical systems as described above.

The monomers and optional catalyst are kept in the first reactor for a period of time to permit a conversion from about 35 to 85% depending on the number of reactors in the chain. Typically the conversion of monomer to polymer coming out of the first reactor should be from about 50 to 80%. The residence time in the first reactor should be from 1 to 3 hours depending on the size of the reactor and the rate of feed to the reactor.

The polymer melt is pumped from the first reactor to the second reactor 9 by a pump 10 through a heated or insulated line 17 maintain at T3. The second reactor, like the first reactor also has a jacket 11 and is maintained at T4. The second reactor is operated at temperatures from 150 to about 250, most preferably from about 185° to 200° C.

The polymer melt is held in the second reactor for a period of time from about 1 to 3 hours to bring the conversion up to from about 75 to 95, most preferably from 90 to 95%.

The polymer melt is then pumped from the second reactor by a pump 12. In the embodiment shown in the drawing the polymer melt is pumped through line 13 to reactor (or preheated) 14. The reactor is preferably a tube shell type heat exchanger. Reactor 3 may comprise a single pass tube in shell heat exchanger with static mixers for a more uniform product; or an extruder-type device if additional pressure is required. The shell enclosing the tubes through which the polymer melt passes is heated and maintained at a temperature of T3 using suitable heating means such as electric heaters, hot oil, water or steam.

The preheater is heated to temperatures up to about 250° C. More typically the preheater will be heated to from about 180 to 210 preferably from 190 to 200, most preferably about 200° C. The residence time of the polymer melt in the preheater may range from about 5 to 15 minutes. Preferably the time is kept a short as possible to minimize polymer degradation and/or depolymerization. The pressure in the preheater should range from about 0.1 to 1.5 typically about 0.5 atm.

Generally, the polymer melt exits the preheater directly into the upper end of devolatilizer 15. The devolatilizer is operated at a temperature T6 from about 150 up to about 225, preferably from about 200° to 220° C. The internal pressure in the devolatilizer is below atmospheric, typically less than about 0.02, most preferably less than about 0.01 most preferably less than about 0.005 atmospheres. While the embodiment in FIG. 1 shows only one devolatilizer the devolatilizer may comprise a series of two devolatilizers as are disclosed in a number of patents in the name of Monsanto. The devolatilizer may be a falling strand devolatilizer. That is the polymer melt falls as strands from the top to the bottom of the devolatilizer. As the polymer descends to the bottom of the devolatilizer the unreacted monomer and diluent evaporate from the polymer and are withdrawn from the devolatilizer. Depending on the polymer viscosity and the level of unreacted monomer polymer distributors may be used. For example, the polymer melt could be held in a sub atmospheric chamber for longer periods of times by using a buffer or catcher tray, such as those disclosed in U.S. Pat. application No. 271,636 in the name of Polysar Financial Services S.A. A further alternative could be to use an extruder type devolatilizer equipped with a single or multi-stage vacuum apparatus to achieve vacuum levels as low as 0.002 atmospheres. Also a suitable carrier solvent such as nitrogen, toluene, ethyl benzene etc., may be used as a nucleating agent and to aid in reducing the partial pressure of unreacted lactide monomer. This would be beneficial in trying to reduce the final level of lactide monomer in the finished product.

Yet another approach could be to use thin film (wiped-film) evaporators where the combination of shorter dwell times, high ratios of surface area to volume and reduced shear rate is of benefit to the properties of the finished product.

The volatiles from the devolatilizer pass to a condenser 16. The condenser may comprise one or more stages or zones at different temperatures to more completely condense the volatiles and to possibly separate the volatiles into different fractions. The separation may also be achieved by using thin film separators and by changing or increasing the amount of carrier diluent or solvent.

The resulting polymer may then extruded as strands and cooled and chopped into pellets which then may be moulded, extruded, blown or thermoformed into various articles.

The polymer resulting from the process of the present invention should have an intrinsic viscosity from about 0.5 to about 2.5 indicating a molecular weight from about 50,000 to about 300,000.

The process of the present invention has been described in association with two reactors. However, the chain could comprise from two to five, more typically two to three reactors.

The present invention will now be illustrated by the following non limiting example in which unless otherwise indicated parts are parts by weight.

EXAMPLE 1

A continuous polymerization of 1-lactide was carried out using a pilot plant having a single CSTR reactor in a layout as in FIG. 1. After reaching steady state in about 7 hours, the monomer was melted in a prereactor and fed into the reactor at a rate of 10 lb/hr. The reactor was operated at 178° C. The reactor was a stirred tank reactor. A catalyst comprising stannous 2-ethyl hexanoate was fed to reactor at a rate of 1-1.5 g./hr. Due to a mechanical problem the catalyst feed was 0.1% based on monomer. The target feed was 0.65% based on monomer. As a result the molecular weight of the resulting lactide polymer was low. The residence time in the first reactor was about 4 hours. The conversion in the reactor after reaching steady state was from 95.5 to 96%.

Due to the problem with catalyst feed the product exiting the reactor was sampled and conversion (gravimetric in an oven) was determined. As indicated the conversion was constant. The other variables including temperature, RPM of the stirrer, etc remained essentially constant, with in experimental error given the continuous nature of the process. The conversion result during start-up and while running are set forth in Table 1.

TABLE 1

Continuous Bulk Polylactide Process

| DATE | TIME | Conversion % SOLIDS (Oven method) |
|---|---|---|
| 12/12/90 | 09:50 | 54.1 |
| 12/12/90 | 10:50 | 97.1 |
| 12/12/90 | 11:50 | 93.6 |
| 12/12/90 | 12:50 | 92.5 |
| 12/12/90 | 13:50 | 92.9 |
| 12/12/90 | 16:45 | 96.8 |
| 12/12/90 | 18:15 | 95.3 |
| 12/12/90 | 21:50 | 96.1 |
| 12/13/90 | 00:50 | 96.8 |
| 12/13/90 | 04:50 | 96.8 |
| 12/13/90 | 09:55 | 89.8 (*) |
| 12/13/90 | 12:00 | 95.5 |
| Onset of Continuous operation: | | 17:00 hours on 12/12 |
| End of Continuous operation: | | 13:30 hours on 12/13 |

TABLE 1-continued

| TOTAL Continuous operation: | 20:50 hours |
|---|---|

(*) sample degraded during oven test.

The results show that lactide polymer may be produced by a continuous process.

What is claimed is:

1. A continuous process for the polymerization of monomeric mixture comprising from 100 to 60 weight % of one or more monomers the formula

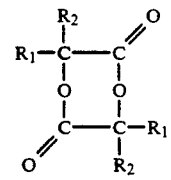

wherein $R_1$ is hydrogen atom or a $C_{1-4}$ alkyl radical; and $R_2$ is a hydrogen atom or a $C_{1-8}$ alkyl radical, provided that $R_1$ and $R_2$ cannot both be a hydrogen atom; and 0-40 weight % of one or more copolymerizable monomers which comprises:

(a) forming a melt or solution of said monomers;
(b) passing said monomeric melt or solution continuously through a chain of at last two reactors operated at temperatures from 175° to 250° C. and at a pressure ranging from 0.5 to 5 atmospheres at a rate and for a residence time to provide not less than 75% conversion of said monomer mixture to polymer.

2. A process according to claim 1, wherein said copolymerizable monomer is selected from the group consisting of $C_{2-4}$ alkylene oxides.

3. A process according to claim 1, further comprising passing said melt of polymer through a preheater operated at a temperature from 180° to 220° C. at a pressure from 0.1 to 1.5 atmospheres for a time from 0.5 to 5 minutes.

4. A process according to claim 3, further comprising substantially upon exit from said preheater passing said polymer melt through a devolatilizer operated at a temperature from 150° to 225° C. and at a pressure of less than 0.02 atmospheres.

5. A process according to claim 1 wherein each successive reactor is operated at a temperature of up to 15° C. higher than the preceding reactor.

6. A process according to claim 4, wherein each successive reactor is operated at a temperature from 5° to 10° C. higher than the preceding reactor.

7. A process according to claim 5, wherein said reactors are continuous stirred tank reactors.

8. A process according to claim 6, wherein said devolatilizer is a falling strand devolatilizer.

9. A process according to claim 6, wherein the volatiles recovered from said falling strand devolatilizer is recycled to said reactors.

10. A process according to claim 8, further comprising adding to one or more said reactor(s) a catalyst.

11. A process according to claim 9, wherein said catalyst is selected from the group consisting of tin esters of $C_{1-18}$ carboxylic acids.

12. A process according to claim 10, wherein the diluent or solvent for said catalyst is selected from the group consisting of $C_{6-12}$ aromatic solvents, $C_{6-12}$ alkanes which are unsubstituted or substituted by a $C_{1-4}$ alkyl radical which are unsubstituted or substituted by a $C_{1-4}$ alkyl radical, $C_{1-6}$ ketones.

13. A process according to claim 11, wherein said catalyst is stannous octoate.

* * * * *